United States Patent
Coburn

[11] Patent Number: 6,136,439
[45] Date of Patent: *Oct. 24, 2000

[54] MONOLAYER POLYMERIC FILM AND METHOD OF FABRICATION

[76] Inventor: Theodore R. Coburn, 1605 Hill Farm Rd., Coventry, R.I. 02816

[*] Notice: This patent issued on a continued prosecution application filed under 37 CFR 1.53(d), and is subject to the twenty year patent term provisions of 35 U.S.C. 154(a)(2).

[21] Appl. No.: 08/948,869

[22] Filed: Oct. 10, 1997

Related U.S. Application Data

[60] Provisional application No. 60/029,076, Oct. 23, 1996.

[51] Int. Cl.$^7$ ................................................. B32B 31/26
[52] U.S. Cl. .................... 428/409; 428/141; 428/520; 428/346; 264/210.5; 264/288.4; 264/423; 264/469; 264/177.19; 264/177.23; 264/235.6
[58] Field of Search ........................ 428/141, 409, 428/520, 346; 264/210.5, 288.4, 423, 469, 177.19, 171.23, 235.6

[56] References Cited

U.S. PATENT DOCUMENTS

| | | | |
|---|---|---|---|
| 4,578,414 | 3/1986 | Sawyer et al. | 524/310 |
| 4,835,218 | 5/1989 | Yoshimura et al. | 525/98 |
| 5,120,888 | 6/1992 | Nohr et al. | 524/99 |
| 5,135,800 | 8/1992 | Nagaoka et al. | 428/216 |
| 5,151,309 | 9/1992 | Dollinger | 428/40 |
| 5,206,273 | 4/1993 | Chen et al. | 523/300 |
| 5,232,966 | 8/1993 | Chen et al. | 524/224 |
| 5,242,650 | 9/1993 | Rackovan et al. | 264/509 |
| 5,286,525 | 2/1994 | Chen et al. | 427/256 |
| 5,427,727 | 6/1995 | Tung | 264/211 |
| 5,435,963 | 7/1995 | Rackovan et al. | 264/509 |
| 5,451,283 | 9/1995 | Josephy et al. | 156/229 |
| 5,496,635 | 3/1996 | Francis et al. | 428/352 |
| 5,520,760 | 5/1996 | Freedman | 156/152 |

*Primary Examiner*—William P. Watkins, III
*Attorney, Agent, or Firm*—Pierce Atwood; Chris A. Caseiro

[57] ABSTRACT

A monolayer printable polymeric film and method for making the film. The film is formed by mixing a structural material, such as polypropylene or polyethylene, with a printable material, such as vinyl-acetate or methacrylate, to form a unitary mixture prior to processing. The unitary mixture is extruded and heated so as to cause the printable material to bloom to the surface of the unitary mixture. Stretching of the mixture at temperatures greater than permissible for multi-layered films formed of separate structural and printable materials heat sets and relaxes or stress relieves the film that is formed. The result is a monolayer film that is stiffer and that lays much flatter than the prior multi-layered films that were prone to curling. The mixture is preferably heated to 270° F. or greater during the stretching process.

12 Claims, 1 Drawing Sheet

MONOLAYER POLYMERIC FILM AND METHOD OF FABRICATION

This application claims the benefit of U.S. Provisional No. 60/029,076 filed Oct. 23, 1996.

BACKGROUND OF THE INVENTION

1. Field of the Invention

The present invention relates to polymeric films used for a wide variety of purposes. More particularly, the present invention is related to polymeric films that act as substrates or facestock for labels, and many other film-based products. Still more particularly, the present invention is related to monolayer polymeric film products which are subsequently printed with a variety of printing systems.

2. Description of the Prior Art

It is well known that labels, tapes, decals, etc., are widely-accepted means for conveying information. For many years, the information was printed on a thin paper product that either had a pressure-sensitive adhesive backing, or that was otherwise adhere to the surface of interest. Paper was used, and continues to be used, because it has sufficient flexibility and toughness to conform to various surfaces without tearing-at least without tearing immediately. A further advantage of paper is its ability to accept print applied in the variety of ways that print is applied, including, but not limited to, offset, thermal transfer, letterpress, rotogravure, flex, and screen. That is, the print can easily be applied without concern that it will separate from the paper substrate.

At least one disadvantage in the use of paper as a label substrate is its moisture absorbency. This characteristic can cause a reduction in tear strength as well as a reduction in shelf life. Other problems with paper labels include curling of the material and the general aesthetics of the paper. In order to overcome these and other disadvantages in the use of paper as a label substrate, viscoelastic, or polymeric, films have been developed. Polymeric films—including those made with polyethylene or polypropylene as the foundation component—have been developed as substitutes for paper label substrates. This material is relatively inexpensive to obtain and to fabricate in the thickness range of interest and noted. It also has a higher tear strength than paper. Further, it is much more moisture resistant that paper. Two disadvantages of note, however, include the ability of polymeric films to conform to flexible items to which they are affixed, and the difficulty in getting polymeric films to accept print of the types described.

Fairly recent developments in polymeric film fabrication have addressed the problem of conformance to flexible surfaces. That problem occurs, for example, when a label is affixed to a bottle or container made of a flexible material—such as a plastic beverage container. The label must be sufficiently flexible to conform to changes in the container surface, when, for example, the bottle is squeezed. The label must, however, be tough enough to remain in tact under those conditions so that the information thereon remains visible. The primary means for addressing this issue has been the introduction of a film-processing step that substantially aligns the molecular structure of the polymer as it is being stretched to its desired thickness.

It is important to understand in considering the processing of these types of films that the material used is a thermoplastic polymer. That is, the material can be heated to a temperature high enough to cause it to become fluid-like without being a liquid, so that it may be made into virtually any desired shape and is much more "handleable" than cast thermoset polymers. The shaping of the material is achieved by mechanically stretching or orienting the polymer chains in a particular way. As the material is chilled, it solidifies into the desired shape, albeit with some shrinkage as crosslinking occurs. Thermoplastic materials may be formed and re-formed in this way into a variety of shapes. Thermoset polymers, on the other hand, can only be processed once. Any subsequent attempts to heat them for reforming result in irreversible degradation.

In the field of film substrates, the processing of the thermoplastic polymer can be arranged such that the desired film shape-principally an issue of thickness—is achieved, along with the conformability and strength needed for the flexible containers noted. The shaping and strengthening is achieved by stretching an extruded film that is initially about 10–12 mils thick over a plurality of rollers so as to thin it while also orienting the polymeric chains substantially in a single direction. This processing technique has been available for quite some time. One example of it is described in U.S. Pat. No. 5,186,782 issued to Freedman. The Freedman patent describes the orientation of a facestock film so as to provide greater stiffness in that direction while maintaining conformability.

The problem with the prior-art means for producing a conformable film involves the printability of the film. Inherent in the nature of the polymeric materials used to produce these films is the lack of a suitable film surface profile to which print can adhere. In general, fabricated polyethylene and polypropylene lacks sufficient "nooks and crannies" to which print ink can adhere. As a result, the surface of the material must be treated, or a more suitable material must be applied to the surface of the polymer. In the field of plastic films, labels, etc., treatment of the polymer surface is either too expensive, or it simply cannot be done for the film thickness range indicated. Therefore, the industry standard at present is to co-extrude at least a second layer of material with the primary facestock layer, where the second layer more readily accepts print, but does not have the strength of the primary material. Further, it is fairly common for that second material to be applied to both sides of the primary material. The label stock for printing described in the Freedman patent describes this layering of different materials.

It has been determined that vinyl-acetate, generally in an ethylene-vinylacetate (EVA) complex, will accept print of the type commonly used throughout the printing field—whether oil- or water-based. By forming a multi-layered film, it is possible to produce a relatively inexpensive, printable, and conformable substrate that is of interest to the label industry.

A significant drawback to this multi-layer processing, however, relates to the quality of the film provided. Specifically, the layering of two unlike materials, each of which has its own set of optimal processing conditions, yields an inferior product. In particular, the primary material, which is typically polypropylene, but may be polyethylene or a co-polymer of polypropylene and polyethylene, can and should be heated to temperatures on the order of 270° F. 295° F. for proper orientation processing. Processing at lower temperatures reduces stabilization of the crystalline polymer and thereby reduces the resultant stiffness, flatness, and curl of the film. EVA, on the other hand, must not be processed at a temperature greater than 250° F. when it is formed as its own distinctive layer. Further, the two dissimilar materials orient (flow) and shrink differently as they are heated, cooled, and solidify. In fact, the amorphous EVA shrinks in a different way than the crystalline polypropylene, particularly as it approaches the polypropylene processing temperature of 250° F. Because of this dissimilarity, delamination and curling of the multi-layer film is common. In addition, processing at lower temperatures creates a tension in the structural matrix of the film that can only be relieved by natural curling of the film. As a result of these two problems, a label or other type of identifier having such a film facestock is extremely difficult to print, and causes considerable waste as the film either separates, curls, or a combination of the two. Unfortunately, this problem cannot be avoided in that the layering of materials for print labeling forces the manufacturer to process at temperatures no greater than 250° F.

Therefore, what is needed is a polymeric film substrate that is conformable to an array of surfaces, flexible or otherwise. What is also needed is a polymeric film substrate for labels, tapes, etc., to which a variety of printing inks will adhere. Further, what is needed is a polymeric film substrate that will not delaminate and which is substantially curl-free. Yet further, what is needed is a polymeric film substrate that can be processed under optimal conditions and with little, if any, increase in the cost typically associated with such fabrication.

SUMMARY OF THE INVENTION

It is an object of the present invention to provide a polymeric film substrate that is conformable to an array of surfaces, flexible or otherwise. It is also an object of the present invention to provide such a polymeric film substrate for labels, tapes, etc., to which a variety of printing inks will adhere. It is another object of the present invention to provide such a polymeric film substrate that will not delaminate and which is substantially curl-free. It is yet another object of the present invention to provide a fabrication process to produce such a polymeric film substrate using techniques similar to those used for monolayer and multi-layer films with little, if any, increase in the cost typically associated with such fabrication.

These and other objectives are achieved in the present invention through the combination of a primary polymer material and a secondary polymer material that are mixed together prior to extrusion as a single layer for subsequent stretching and either bi-, or uni-directional, orientation. In the preferred embodiment of the invention, the primary material is polypropylene of the type commonly used in the fabrication of film substrates. It is to be understood, however, that other materials acting as the structural component of the mixture, may be used, including, but not limited to, polyethylenes such as high-density polyethylene, and co-polymers of polyethylene and polypropylene. The secondary material is preferably a combination of components that must include enough vinyl-acetate (VA) such that there is a total of at least 5% by weight of VA in the mixture of the primary and secondary materials. The VA may be combined with a VA-carrier material, that may be, but is not limited to, polyethylene, generally identified as EVA, for ethyl-vinyl-acetate. Alternatively, it has been determined that another suitable print carrier material is from the family of acrylics, such as methacrylate (MA) in a carrier identified as ethyl-methacrylate (EMA).

The key to the present invention is the mixing together of the VA- or MA-containing material and the primary material prior to extruding that mixture for delivery to subsequent processing. This unitary mixture may be processed differently than if the two materials were processed as distinctive layers. The inventor has determined that the unitary mixture may be processed and oriented at a temperature exceeding the permissible temperature for processing of the VA- or MA-containing material. As a result, higher heat stabilization of the structural polypropylene part of the mix is achieved, thereby making the end-product film stiffer while retaining sufficient flexibility to maintain conformability with a variety of substrates. It is also possible to reduce or eliminate curling of the end-product film in that processing at a relatively higher temperature, that may range from 270° F.–295° F., creates the opportunity to heat set and then stress relieve or relax from the high temperature to a lower temperature so as to relax the molecular structure of the film. Since the primary structural material and the secondary printable material are provided in a uniform blend, there is uniform relaxation.

The unitary mixture of the structural primary material and the secondary material is formulated so as to ensure "printability" of the end-product film. In particular, the secondary material contains vinyl-acetate in an EVA matrix. As noted, the printable material may alternatively be the methacrylate in an EMA matrix. Under the processing temperatures noted, the vinyl-acetate is released, that is, it moves through the mixture matrix, or "blooms" to the surface of the film so as to provide a film surface having at least about 5% by weight of vinyl-acetate. This quantity of vinyl-acetate in an EVA matrix has been determined to be sufficient for attachment of print ink under any one of the six printing methods previously noted. A similar concentration of methyl-acrylate in EMA works as well.

The present invention involves a novel fabrication process that results in a novel film facestock usable in a wide array of applications. The combination of the structural and printable materials prior to extrusion permits processing at higher temperatures that eliminates the delamination and curling associated with the present techniques for making printable film facestock. These and other advantages of the present invention will become apparent to those skilled in the art upon review of the following detailed description and the accompanying drawing.

DESCRIPTION OF THE PREFERRED EMBODIMENT OF THE INVENTION

Figure 1:
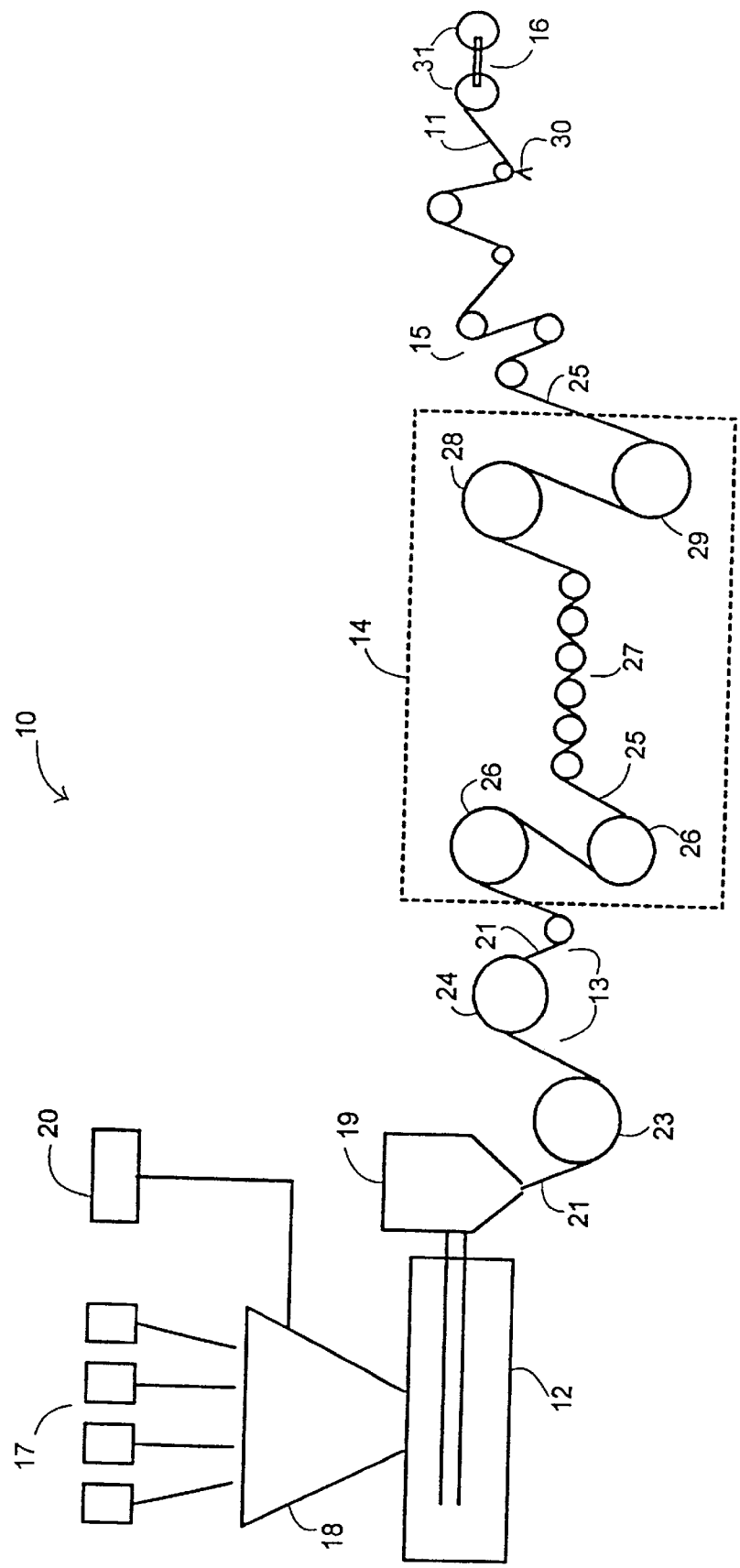
FIG. 1 is a simplified diagrammatic diagram of the processing technique of the present invention, showing the mixing of the novel unitary mixture of the present invention prior to orientation and stretching of the monolayer facestock.

FIG. 1 shows a simplified diagrammatic view of a film fabrication system 10 used in the novel fabrication process of the present invention to create a novel monolayer printable film facestock 11. Primary components of the system 10 include an extruder 12, a casting unit 13, a film-orientation unit 14, a corona treatment unit 15, and an end-product winder 16.

As earlier noted, the novel technique of the present invention is to combine a primary structural material, preferably a homogeneous polypropylene, with a secondary printable material, preferably vinyl-acetate or methacrylate in a carrier, which carrier may be polyethylene, prior to delivery to the extruder 12. It is to be noted that the primary structural material may be polyethylene or a copolymer of polyethylene and polypropylene. The materials may be in pellet or other suitable form, and may include one or more supplemental components delivered via chutes of a component feeder 17 into a mix hopper 18. All of the components are then transferred from the hopper 18 into the extruder 12 for mixing at a temperature of about 460° F. prior to transfer to a die 19. The extruder 12 and the die 19 can be of any type known to those skilled in the art to be suitable for mixing and extruding components of the type described herein. It is to be understood that the particular means for mixing the structural material and the printable material is not the key to the invention, rather, it is that the mixing occurs prior to and during extrusion and film forming. In particular, the primary and secondary materials are fluid-like in the extruder 12, and as they emerge from the die 19, so that mixing does, in fact, occur. This is clearly distinct from the prior art, which involves extrusion of two distinct layers of material, one acting as the structural component and the other acting as the printable component.

It is important to note that in order for a sufficient quantity of vinyl-acetate to bloom to the surface of the film facestock 11, it is necessary to add enough of the secondary material such that a unitary mixture 21 coming from the die 19 has at least 5% by weight of the printable material, such as the VA or the MA. In the preferred embodiment of the present invention, where the facestock 11 is a clear product, the unitary mixture 21 includes 66% by weight of the homopolymer polypropylene and 34% by weight of a VA-containing material that may be EVA with 30% by weight VA. It is to be understood that similar amounts of EMA and MA may be substituted for the EVA and the VA. If the facestock 11 is to be matte white, a white concentrate may be added and the amount of polypropylene reduced by an equivalent amount. Other components may be added to the mix in order to enhance various characteristics of the end-product film 11. It is important, however, that the end mixture at the die 19 include at least 5%, and preferably about 7%, by weight of the secondary printable material. The VA- or MA-carrier material may be obtained from any of a variety of sources, including, but not limited to Exxon Corporation of New Jersey.

After the mixing of the primary and secondary materials, the unitary mixture 21 is then transferred from the die 19 to a first casting chiller roll 23. The unitary mixture 21 containing a blending of the primary structural material and the secondary printable material is approximately, but is not limited to, 10 –12 mils thick as it moves to the first casting chiller roll 23.

The unitary mixture 21 moves from the first chiller roll 23 to a second casting chiller roll 24. Rolls 23 and 24 may be of any suitable temperature, but preferably about 100° F. This chilling of the unitary mixture 21 acts to solidify it into a film-like material. From the second chiller roll 24, the unitary mixture 21 is delivered to the film-orientation unit 14. It is in this part of the system 10 that the process of the present invention is unique. In the orientation unit 14 the unitary mixture 21 is stretched and oriented into a monolayer film 25 that can range in thickness from about 1–3 mils, but can be something thinner or thicker than that range. A preheater pair of rollers 26 at a temperature of about 200° F.–240° F. warm and begin softening the mixture 21 that is a film after the chill casting stage of the process. A series of stretching rollers 27 at a temperature of about 240° F. act to considerably increase the length of the film 25. That step thins the film 25 while creating a unidirectional molecular orientation that provides Increased stiffness in the film 25. It is possible to provide the facestock 11 without this specific stretching step; however, the resultant film may have less strength and stiffness than that developed during stretching.

In the prior-art systems, the remainder of the orientation process operates at approximately 240° F.–250° F. However, in the next stage of the present invention, the orientation process heat setting and then stress-relieving or relaxing of the film 25 occurs as the film 25 is transferred to a heat-stabilization roller 28, which may be one or more rollers, that is/are at a temperature in the range of about 270° F. to about 295° F. This imparts better stiffness and flatness in the end product in that the film 25 is unstressed as it moves across a cooling roller 29 that may be at ambient temperature. From the orientation unit 14 the film 25 moves to the corona-treatment unit 15 where the film surface is further enhanced for printing in a manner well known to those skilled in the art. Final processing of the film may include cutting of rough film edges by a slitter 30. Scraps of the film 25 from the slitting process may be returned to a secondary feeder 20 for re-introduction into the process and subsequent use. The final film facestock 11 is then wound onto transfer rolls 31 of the winder unit 16 for delivery to users.

The novel process described herein results in the formation of the film facestock 11 that is a monolayer film having structural integrity and a vinyl-acetate or a methacrylate surface bloom occurring at or about roller 28 that renders the surface of that film suitable for printing using many standard printing techniques.

The invention description herein is directed to a specific embodiment, however, it is apparent that many modifications, variations, and equivalents may be implemented by one skilled in the art without departure from the spirit and scope of the novel concepts of the present invention.

I claim:

1. A method for producing a monolayer printable polymeric film comprising the steps of:

a. mixing a primary polymeric structural material and a secondary printable material together, and without additional additives designed to couple said primary polymeric structural material and said secondary printable material together, to form a unitary printable/structural mixture thereof;

b. directing said unitary mixture to an extrusion means to create an extruded unitary printable/structural mixture;

c. directing said extruded unitary printable/structural mixture to one or more casting rollers and then to one or more stretching rollers to form a stretched unitary mixture; and d. directing said stretched unitary mixture to one or more heat-stabilization rollers for simultaneously further stretching said unitary mixture and heat treating said unitary mixture to a temperature sufficient to cause a portion of said secondary printable material to bloom to a surface of said unitary mixture and to impart stiffness and flatness to said stretched unitary mixture without delamination and minimal curling to form a monolayer polymeric film.

2. The method as claimed in claim 1 wherein one or more of said one or more heat-stablization rollers is heated to a temperature of at least 270° F.

3. The method as claimed in claim 1 wherein said secondary printable material is vinyl-acetate.

4. The method as claimed in claim 3 wherein said vinyl-acetate is at least 5% by weight of said unitary mixture.

5. The method as claimed in claim 4 wherein said vinyl-acetate is provided in an ethylene-vinyl-acetate copolymer.

6. If The method as claimed in claim 1 wherein said secondary printable material is methacrylate.

7. The method as claimed in claim 6 wherein said methacrylate is at least 5% by weight of said unitary mixture.

8. The method as claimed in claim 7 wherein said methacrylate is provided in an ethyl-methacrylate copolymer.

9. The method as claimed in claim 1 further comprising the step of providing corona treatment to said monolayer polymeric film.

10. The method as claimed in claim 1 wherein said primary structural material is polypropylene.

11. The method as claimed in claim 1 wherein said primary structural material is polyethylene.

12. A product made by the process described in claim 1.

* * * * *